W. B. MUNN.
Machine for Making Lightning-Rods.
No. 8,696. Reissued May 6, 1879.
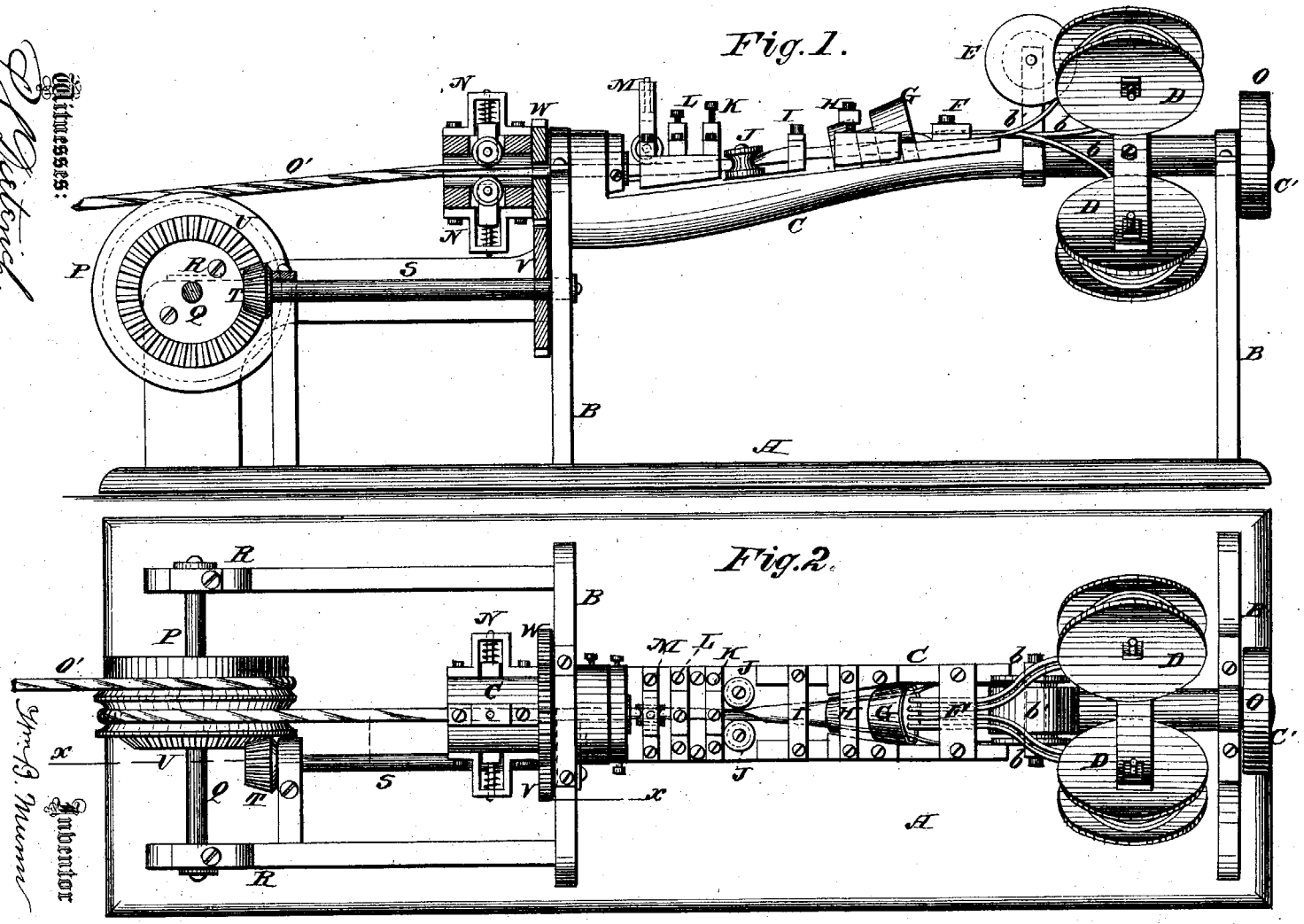
Witnesses:
P. Dietrich.
C. H. Walton
Inventor
Wm. B. Munn
Per Wm. C. W. Intire Attorney.
N. PETERS, PHOTO-LITHOGRAPHER, WASHINGTON, D. C.

UNITED STATES PATENT OFFICE.

WILLIAM B. MUNN, OF CAMDEN, NEW JERSEY.

IMPROVEMENT IN MACHINES FOR MAKING LIGHTNING-RODS.

Specification forming part of Letters Patent No. 161,541, dated March 30, 1875; Reissue No. 8,696, dated May 6, 1879; application filed April 4, 1879.

*To all whom it may concern:*

Be it known that I, WILLIAM B. MUNN, of Camden, in the county of Camden and State of New Jersey, have invented certain new and useful Improvements in Lightning-Rod Machines; and I do hereby declare that the following is a full and exact description thereof, reference being had to the accompanying drawings, making a part of this specification.

My invention consists in so distorting it or cutting it away for a portion of its length that the tools and dies for straightening the wires, and for turning in and rolling down the copper covering, may be secured to said shaft so as to operate in the line of the true axis of the shaft, as will be hereinafter more fully set forth.

My invention further consists in combining with the distorted shaft, on and through which the wires are huddled and covered, a drawing-drum whose axis of motion is at right angles to said shaft, whereby the finished rod is drawn away and twisted, as will be hereinafter set forth.

To enable others skilled to fully understand the construction and operation, I will proceed to describe the same, referring by letters to the accompanying drawings, in which—

Figure 1 is a side elevation of a machine for manufacturing twisted wire rods, the extreme finishing end of the shaft being shown in section to present a view of the final creasing and rolling in tools or rotary dies; and Fig. 2 is a top view of the same.

Similar letters indicate like parts in the several figures.

A represents the bed-plate of the machine, and B B vertical bridges, upon the tops of which are secured suitable boxes *a a*, in which the shaft C is mounted. D D D D are four or more reels, mounted upon and around the rear end of the shaft, upon which the necessary number of wires *b* are wound, and from which they are fed to the straightening and covering tools. E is a reel, upon which the strip of sheet-copper *b′* is wound, and from which it is fed under the straightening-tool and beneath the wires. F is a suitable plate or block, secured by screws or other suitable means to the shaft, and through which the wires from the reels D D are passed and straightened. G H I J K L M are a series of tools secured in a similar manner to the shaft, and they successively "huddle" the wire and gradually turn the sheet-copper *b′* around the said wires to form a complete covering. The covered wires then pass through the true axis of the shaft C, and the covering is creased or forced into the angular spaces between the wires by four or more revolving spring rollers or creasers, N N, arranged around the shaft C at or near its extreme end.

By reference to Fig. 1 it will be seen that the shaft C is so shaped or cut away that the wires to form the core and the sheet-copper covering may be gradually and successively operated upon by tools mounted upon the shaft, and finally presented and fed through the true axis of the shaft for final creasing.

When desirable to make a rod with a central core-wire surrounded by other and smaller ones, the core-wire may be fed through the true axis of the shaft at the end C′, in which case the sheet-copper *b′* should be fed from beneath through a suitable slot in the shaft.

O is a suitable pulley for aiding in imparting rotary motion to the shaft C, for twisting the covered rod to give it the appearance seen at O′. This twisting is accomplished by passing the covered and finally creased rod over a drawing reel or drum, P, mounted upon a shaft, Q, having bearings at R. This drum P, moving in fixed bearings, while the shaft C is rotated, is not only capable of taking away the covered rod, but coacts with the shaft in twisting the rod, as shown at O′.

The rotary motion of the drum P is produced in the following manner: The drum is provided at one end with a beveled gear, U, which meshes with a bevel-pinion, T, secured on a shaft, S, arranged at right angles to the axis of the drum. On the opposite end of this shaft S is arranged a pinion, V, meshing with a driving-gear, W, secured to the shaft C, the arrangement of the respective gears and pinions being such that the proper relative speed will be given to the drum P to draw off and twist the rod.

Of course the tools may be removed and others substituted. They may all be mounted upon a separate plate, and the plate secured to the shaft, or they may be individually connected to the shaft. It will be seen that the shaft C, while it is distorted so as to permit the tools to lie within or near to its true axis, is yet quite as strong as an ordinary straight shaft.

What I claim as new, and desire to secure by Letters Patent, is—

1. The shaft C of a lightning-rod machine, distorted or cut away, as shown, so that a series of tools may be secured thereto, and the covered rod passed through the true axis of the shaft, substantially as and for the purposes set forth.

2. In combination with the rotary shaft C, adapted to receive a series of forming-tools, a paying-off or drawing drum, P, the shaft C and drum P being adapted to rotate upon axes at right angles to each other, substantially as described.

In testimony whereof I have hereunto set my hand this 22d day of March, A. D. 1879.

WM. B. MUNN.

In presence of—
ARTHUR L. MCINTIRE,
WM. C. MCINTIRE.